United States Patent
Hitomi et al.

[54] SPINNING REEL WITH GUARD ARM

[75] Inventors: Yasuhiro Hitomi, Hashimoto; Jun Sato; Seiji Myojyo, both of Sakai, all of Japan

[73] Assignee: Shimano, Inc., Japan

[21] Appl. No.: 08/823,246

[22] Filed: Mar. 24, 1997

[30] Foreign Application Priority Data

May 8, 1996 [JP] Japan ................................. 8-113529

[51] Int. Cl.⁶ .................................................. A01K 89/027
[52] U.S. Cl. .......................................... 242/311; 242/243
[58] Field of Search .................................. 242/243, 291, 242/285, 247, 310, 311, 316

[56] References Cited

U.S. PATENT DOCUMENTS

| | | | |
|---|---|---|---|
| 2,918,227 | 12/1959 | Mauborgne | 242/243 |
| 2,932,464 | 4/1960 | Mauborgne | 242/243 |
| 4,470,554 | 9/1984 | Kobayashi et al. | 242/291 |
| 4,512,531 | 4/1985 | Tunoda | 242/311 |
| 4,529,142 | 7/1985 | Yoshikawa | 242/247 |
| 4,676,451 | 6/1987 | Dispas | 242/291 |
| 4,821,978 | 4/1989 | Kaneko | 242/310 |
| 4,830,306 | 5/1989 | Tsunoda et al. | 242/316 |
| 5,374,001 | 12/1994 | Yamaguchi | 242/247 |
| 5,797,554 | 8/1998 | Atherton et al. | 242/311 |

Patent Number: 5,988,549
Date of Patent: Nov. 23, 1999

Primary Examiner—Katherine A. Matecki
Attorney, Agent, or Firm—Jeffer, Mangels, Butler & Marmaro LLP

[57] ABSTRACT

A spinning reel for mounting on a fishing rod includes a reel body having a reel body section and a mounting leg member with a rod attachment member, a rotor, and a spool disposed on the rotor. A guard arm is disposed between the mounting leg member and the rotor.

22 Claims, 5 Drawing Sheets

SPINNING REEL WITH GUARD ARM

FIELD OF THE INVENTION

The present invention relates to a reel, and particularly to a spinning reel mounted on a fishing rod.

BACKGROUND OF THE INVENTION

The conventional spinning reel comprises a reel body which is equipped with a mounting leg for the rod, a rotor that is rotatably supported on the reel body, and a spool which is disposed forward of the rotor, around whose outside surface a fishing line is wound. The rotor has a first rotor arm and a second rotor arm which are disposed facing each other on opposite sides of a rotating shaft. A bail is pivotally supported at the distal ends of the two arms via bail support members. The distal end of one of the bail support members is provided with a line roller. When the line is retrieved, the line is guided onto the outside surface of the spool by the bail and the line roller.

Some spinning reels of this kind are provided with a braking mechanism that brakes the rotation of the rotor when it reverses (when it rotates in the line release direction). The braking mechanism is normally operated using a pivoting brake lever provided on the mounting leg of the reel body. In this type of spinning reel, the brake lever is pivoted towards the rod using the hand which holds the rod, thereby braking the rotor when it reverses.

In the conventional spinning reel described above, casting and line retrieval are frequently performed while grasping the fishing rod in the vicinity of the mounting leg of the spinning reel. There is a risk of the fingers holding the rod coming into contact with the rotor arms, bail support members, line roller, the rotating rotor, or other components. Particularly in spinning reels with brake mechanisms that require frequent operation of the brake lever, the rotor can reverse during braking without the user operating the handle. This makes it more difficult for the user to keep aware of rotor rotation; when braking is relaxed the lever moves towards the rotor side, with the result that the fingers easily come into contact with the rotating rotor.

A need exists for a spinning reel wherein the fingers do not come into contact with the rotating rotor.

SUMMARY OF THE PREFERRED EMBODIMENTS

In accordance with a first aspect of the present invention, there is provided a spinning reel for mounting on a fishing rod which comprises a reel body, a rotor, a spool, and a guard arm. The reel body includes a reel body section and a mounting leg member with a rod mounting member at its distal end for attachment to a fishing rod. The guard arm is disposed between the rod mounting member and the rotor.

When the inventive reel is attached to a fishing rod and the rod is operated while being held in the vicinity of the rod mounting member, the guard arm is disposed between the rotor and the rod mounting member, thereby making it difficult for the fingers holding the rod to come into contact with the rotor, even when the rotor is rotating.

According to a first preferred embodiment, the guard arm is cantilevered on the mounting leg member. The guard arm is securely held in place thereby.

According to a second preferred embodiment, the inventive spinning reel further includes a braking mechanism for braking the rotor when the rotor reverses, and a brake lever for operating the braking mechanism. The brake lever is pivotally supported on the reel body section and has a distal end that extends between the guard arm and the rod attachment member. Since the guard arm is disposed between the distal end of the brake lever and the rotor, it is difficult for the fingers used to hold the rod and operate the brake lever to come into contact with the rotor, even when the brake lever is operated using the same fingers that hold the rod.

In more particular embodiments, the foregoing guard arm is cantilevered on the leg mounting member or on the brake lever. In the latter particular embodiment, since the guard arm moves together with the brake lever, the finger used to operate the brake lever is reliably protected.

According to another preferred embodiment, the guard arm comprises a guard member and a mounting member that supports the guard member. More particularly, at least the guard member is comprised of an elastomer, preferably a soft elastomer. This helps to prevent damage to the rotor if the guard member should happen to contact the rotor. The noise produced by contact serves as a warning.

According to yet another preferred embodiment, the rotor and the guard arm have respective distal ends, and the distal end of the guard arm extends to the vicinity of (i.e., adjacent to) the distal end of the rotor. Substantially the entire rotating section of the rotor is covered thereby, preventing the fingers which hold the pole from coming into contact with the rotor.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
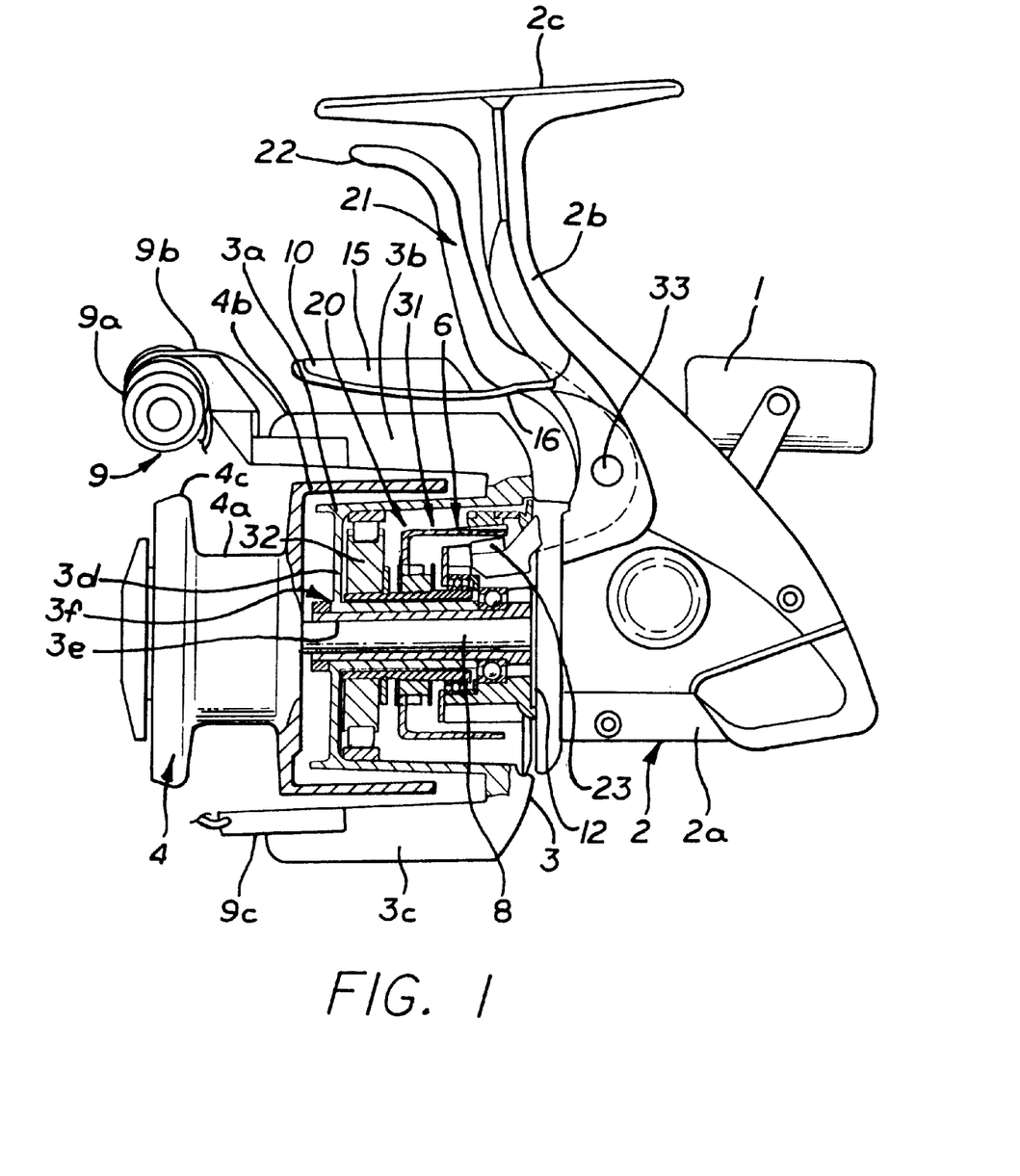
FIG. 1 is a sectional side elevational view of a first preferred embodiment of the present invention.

A first preferred embodiment of the inventive spinning reel as illustrated in FIG. 1 comprises a reel body 2 with a rotating handle 1, a rotor 3 which is rotatably supported at the front of the reel body 2, and a spool 4 located at the front of the aforementioned rotor for reeling up a fishing line.

The reel body 2 has a reel body section 2a, and a mounting leg member 2b, formed on the top of the reel body section 2a, for mounting the spinning reel onto a fishing rod. A rod attachment member 2c which extends forward and back preferably is provided to the distal end of the mounting leg member 2b. The interior of the reel body section 2a contains a rotor drive mechanism (not shown) for rotating the rotor 3, a level wind mechanism (not shown) for moving the spool in the longitudinal direction along the axis of rotation so that the line is wound evenly around the spool 4, and a rotor brake mechanism 6 for braking the rotor. The rotor drive and level wind mechanisms can be any such mechanisms known to those skilled in the art.

The rotor 3 has a cylindrical member 3a, and a first rotor arm 3b and second rotor arm 3c which are disposed facing each other at the sides of the cylindrical member 3a. A boss section 3f provided with a through hole 3e is formed in the center of the front wall 3d of the cylindrical member 3a. The spool shaft 8 and a pinion gear 12 are passed through the through hole 3e. The pinion gear 12 meshes with a master gear (not shown) attached to the rotating shaft (not shown) of the handle 1. A first bail support member 9b is pivotally attached to the first rotor arm 3b. A line roller 9a that is used to guide the fishing line to the spool 4 is mounted on the tip of the first bail support member 9b. A second bail support member 9c is pivotally attached to the second rotor arm 3c. A pivotable bail 9 is located between the second bail support member 3c and the line roller 9a on the tip of the first bail support member 9b.

The spool 4 is located between the first rotor arm 3b and the second rotor arm 3c of the rotor 3, and is mounted on the distal end of the spool shaft 8 via a drag mechanism (not shown). The spool 4 has a spooling drum 4a on whose outside surface the fishing line is spooled, an integrally formed skirt section 4b located to the rear of the spooling drum 4a, and a flange section 4c affixed to the front end of the spooling drum 4a. The spool shaft 8 can be moved in the longitudinal direction by the level wind mechanism.

In the illustrated embodiment, the rotor braking mechanism 6 has a brake member 20 and a brake lever 21 for operating the brake member.

The brake member 20 comprises a brake member body 31 which is braked using the brake lever 21 and a one-way clutch 32 which rotates the brake member body 31 only in association with rotation of the rotor 3 in the release direction.

At the boundary of the reel body section 2a and the mounting leg member 2b, the brake lever 21 is supported in pivoting fashion on the reel body section 2a by a support shaft 33. It is energized in the counterclockwise direction in FIG. 1 by an energizing component (not shown). The brake lever 21 has a control lever section 22 which curves away from the support shaft 33 and projects diagonally upward. A braking action member 23 is provided at the distal end which curves away from the support shaft 33 and projects diagonally downward. The distal end of the control lever section 22 is located in proximity to the rod attachment member 2c.

Figure 2:
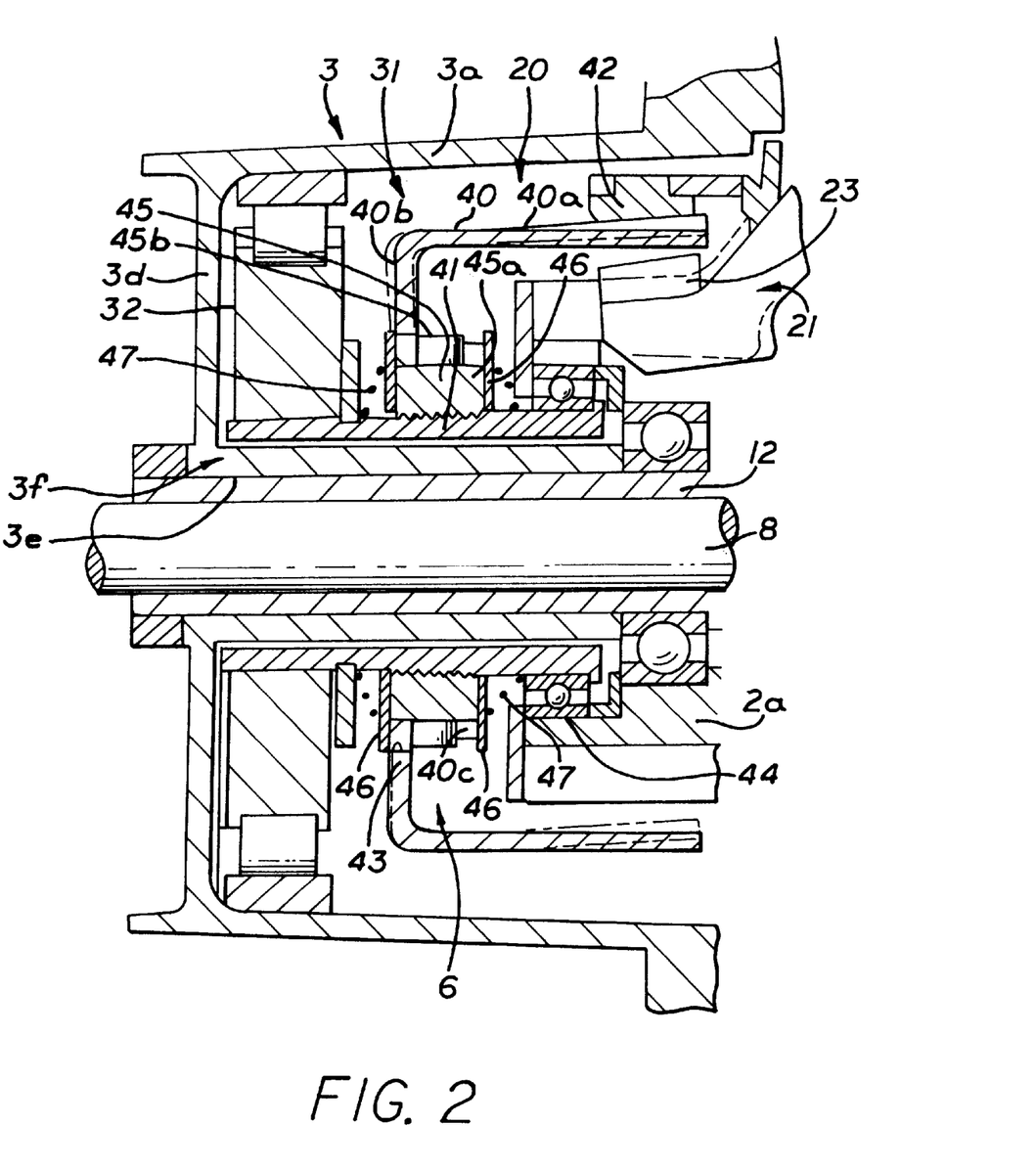
FIG. 2 is a cross sectional view of the brake mechanism thereof.

As shown in FIG. 2, the brake member body 31 comprises a brake cylinder 40 disposed within the rim of the rotor 3 and concentric with the rotor 3, a rotating cylinder 41 which supports the brake cylinder 40 in rocking, non-rotating fashion, and a brake shoe 42 attached to the reel body section 2a.

The brake cylinder 40 takes the form of a bottomed cylinder; the distal end of its outside rim 40a is disposed between the brake shoe 42 and the braking action member 23 of the brake lever 30. The brake cylinder 40 has at its center a support surface 40c that bends inward. The support surface 40c takes the form of a cylinder. The bottom surface 40b of the brake cylinder 40 is provided with a cross-shaped engagement groove 43. The engagement groove 43 extend to the end of the support surface 40c.

The rotating cylinder 41 is supported by the one-way clutch 32 in such a way that its front end rotates in tandem with rotation of the rotor 3 in the line release direction, while the rotational force of the rotor 3 is prevented from acting upon it when the line is reeled in. Its basal end is rotatably supported on the reel body section 2a by a bearing 44. An adjustable joint member 45 for supporting the support surface 40c is provided to the outside surface of the rim in the middle of the rotating cylinder 41. The adjustable joint member 45 comprises a rotating ring section 45a which screws onto the rotating cylinder 41 and whose outside surface has a spherical portion, and four solid cylindrical engagement protrusions 45b which project outward in a cross shape from the outside surface of the rotating ring section 45a. These four solid cylindrical engagement protrusions 45b engage the engagement groove 43, and the support face 40c is supported on the rotating ring section 45a, whereby the brake cylinder 40 is support in rocking, non-rotating fashion on the rotating cylinder 41.

As shown in FIG. 2, a pair of spring bearing rings 46 are disposed on both sides of the rotating ring section 45a, in contact with it. A conical coil spring 47 is disposed in the compressed state between the right spring bearing ring 46 and the bearing 44 and between the left spring bearing ring 46 and the and the one-way clutch 32 in order to maintain the distal end of the brake cylinder 40 in the desired attitude, such that it does not contact the brake shoe 42 and the braking action member 30b of the brake lever 30.

In this way, the brake cylinder 40 is supported in rocking, non-rotating fashion on the rotating cylinder 41. Thus, when braking is applied using the brake lever 21, the brake cylinder 40 tilts to the position indicated by the broken lines in FIG. 2. Since the brake cylinder 40 is supported in rocking fashion on the rotating cylinder 41, the rotating cylinder 41 and pinion gear 12 are not subjected to a bending moment during braking, preventing chafing. Rotation of the rotor 3 proceeds unaffected, preventing rotation from becoming heavy.

The one-way clutch 32 is of a freely-rotating outer ring type, wherein an outside ring is affixed to the cylindrical section of the rotor 3 and an inner ring is affixed to the rim at the distal end of the rotating cylinder 41. This one-way clutch 32 transmits the rotational force of the rotor 3 to the rotating cylinder 41 only when the rotor rotates in the line release direction. Thus, rotation of the rotating cylinder 41 enabling braking the braking mechanism 6 is possible only when the rotor 3 is rotating in the line release direction. When the rotor 3 rotates in the line retrieve direction, the rotating cylinder 41 does not rotate, and braking by the rotor braking mechanism 6 is disabled.

As shown in FIG. 1, a guard arm 10, which projects further forward than the control lever section 22, is disposed between the control lever section 22 and the rotor arms 3b and 3c of the rotor 3. The guard arm 10 has a bar-shaped guard member 15 and a mounting member 16 that supports the guard member 15. In a preferred embodiment, the guard member 15 is comprised of an elastomer such as urethane rubber. Guard member 15 can also be comprised of a non-elastomeric material such as nylon. Guard member 15 is disposed substantially parallel to the spool shaft 8. The support member 16 is a wire-like member bent into a U-shape at its distal end; its basal end is supported in cantilever fashion on the mounting leg member 2b, straddling the control lever section 22. The guard member 15 is integrally formed on the distal end side of the support member 16. By locating the guard arm 10 between the control lever section 22 and the rotor 3, the fingers which hold the rod are prevented from coming into contact with the rotor 3, even when the control lever section 22 of the brake lever 21 is grasped together with the rod with the rod mounted on the attachment member 2c.

The operation of the reel will now be described.

When the bail 9 is moved to the release line position in order to cast the line, the rod is held at a position in proximity to the attachment member 2c of the reel, and the control lever section 22 of brake lever 21 is grasped with the same hand that holds the rod, and let out, the line wound around the outside of the spool 4 is released. Rotation of the rotor 3 is negligible at this time.

To retrieve the line, the bail 9 is moved to the retrieve position. In this state, when the handle 1 is rotated, the rotational force is transmitted to the pinion gear 12 via the rotating handle shaft and the master gear. The rotational force that has been transmitted to the pinion gear 12 is in turn transmitted to the rotor 3 via the front end of the pinion gear, whereupon the rotor 3 rotates in the retrieve direction, so the rotational force is not transmitted to the rotating cylinder 41 by the one-way clutch 32, as discussed earlier. When the pinion gear 12 rotates, its rotation is transmitted to the level wind mechanism by an intermediate gear (not shown). The spool shaft 8 undergoes reciprocating motion in the longitudinal direction so that the line is wound evenly on the spool 4. Since the rotor 3 rotates during this time, and the guard arm 10 is disposed between the brake lever 21 and the rotor 3, the fingers which hold the rod do not come into contact with the rotor 3 even when the reel operates as the rod is held.

When a fish has been caught and the rotor 3 is reversed (rotated in the line release direction) to fight the fish, fighting the fish is accomplished by operating the brake lever 21. When the line is pulled out by the fish such that the rotor 3 reversed, rotational force is transmitted to the rotating cylinder 41 via the one-way clutch 32 in the manner described earlier, and is further transmitted to the brake cylinder 40 via the adjustable joint member 45 so that the brake cylinder 40 moves in tandem with the rotor 3. Grasping the control lever section 22 of the brake lever 21 together with the rod and moving it towards the rod attachment member 2c causes the braking action member 23 to press against the inside surface of the distal end of the outside rim 40a of the brake cylinder 40, thereby inclining the brake cylinder 40 to the position indicated by the broken lines in FIG. 2, pressing the outside surface of the distal end of the outside rim 40a against the brake shoe 42. Braking force is applied to the reversing rotor 3 thereby.

By increasing or decreasing the force applied to the brake lever 21, the braking force can be adjusted, allowing the rotation of the rotor 3 to be adjusted to the desired level. Since the brake cylinder 40 is supported in rocking fashion on the rotating cylinder 41 by the adjustable joint member 45, force which would cause chafing is not applied to the pinion gear 12, so rotation of the rotor 3 does not become heavy. Since a freely-rotating outer ring type one-way clutch 32 is used, the contact force between the rotating roller 52 and the outside ring 50 increases at higher rotation speed, so the initial braking is held at a stable level even if the rotor 3 should reverse and rotate at high speed.

During reverse braking, the rotor 3 reverses as the fishing line is pulled out by the fish, and the angler may become distracted from the fact that the rotor 3 is rotating. Relaxing braking during reverse causes the brake lever 21 to move towards the rotor 3. Since the guard arm 10 is disposed between the rod attachment member 2c and the rotor 3, the finger grasping the brake lever does not come into contact with the rotor 3 even where both the brake lever 21 and the rod are held with the same hand.

Figure 3:
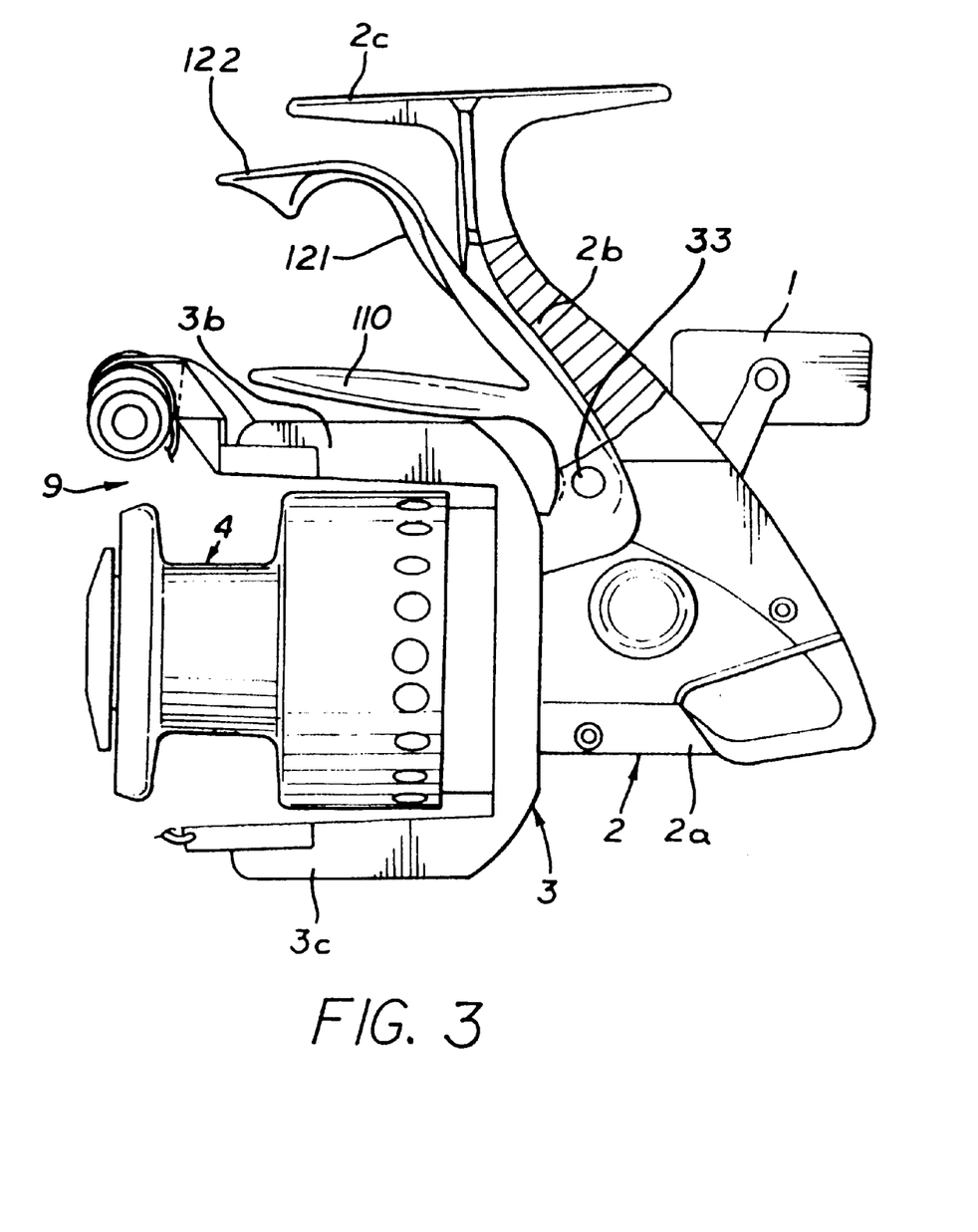
FIG. 3 is a side elevational view of another preferred embodiment in which the guard arm is cantilevered from a brake lever.

An alternative embodiment in which a guard arm 110 is supported at its basal end in cantilever fashion by a brake lever 121, as depicted in FIG. 3, is also possible. In this embodiment, the guard arm 110 pivots together with the brake lever 121, thereby reliably protecting the finger used to operate the control lever section 122.

Figure 4:
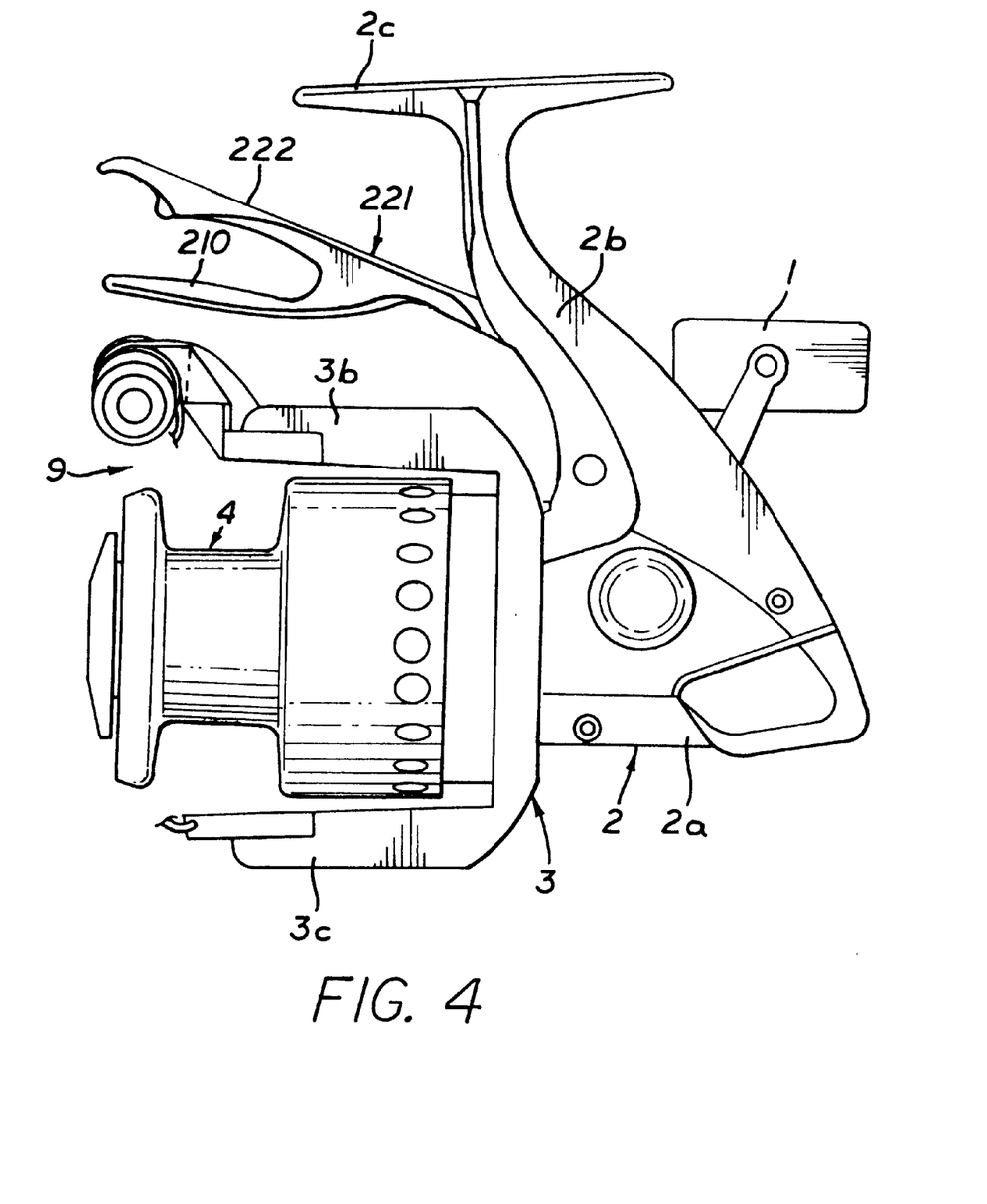
FIG. 4 is a side elevational view of another preferred embodiment in which the guard arm extends to the distal end of the rotor.

Another embodiment, illustrated in FIG. 4, includes a guard arm 210 which extends to the vicinity of the bail 9 at the distal end of the rotor 3. The control lever section 222 of the brake lever 221 is also extended forward to the distal end of the bail 9. The guard arm 210 is supported in cantilever fashion on the control lever 222 of the brake lever 221, branching out from the control lever 222 and extending forward. By extending the guard arm 210 to the vicinity of the bail 9, the entire rotating rotor 3 is covered, preventing the fingers from contacting it.

Figure 5:
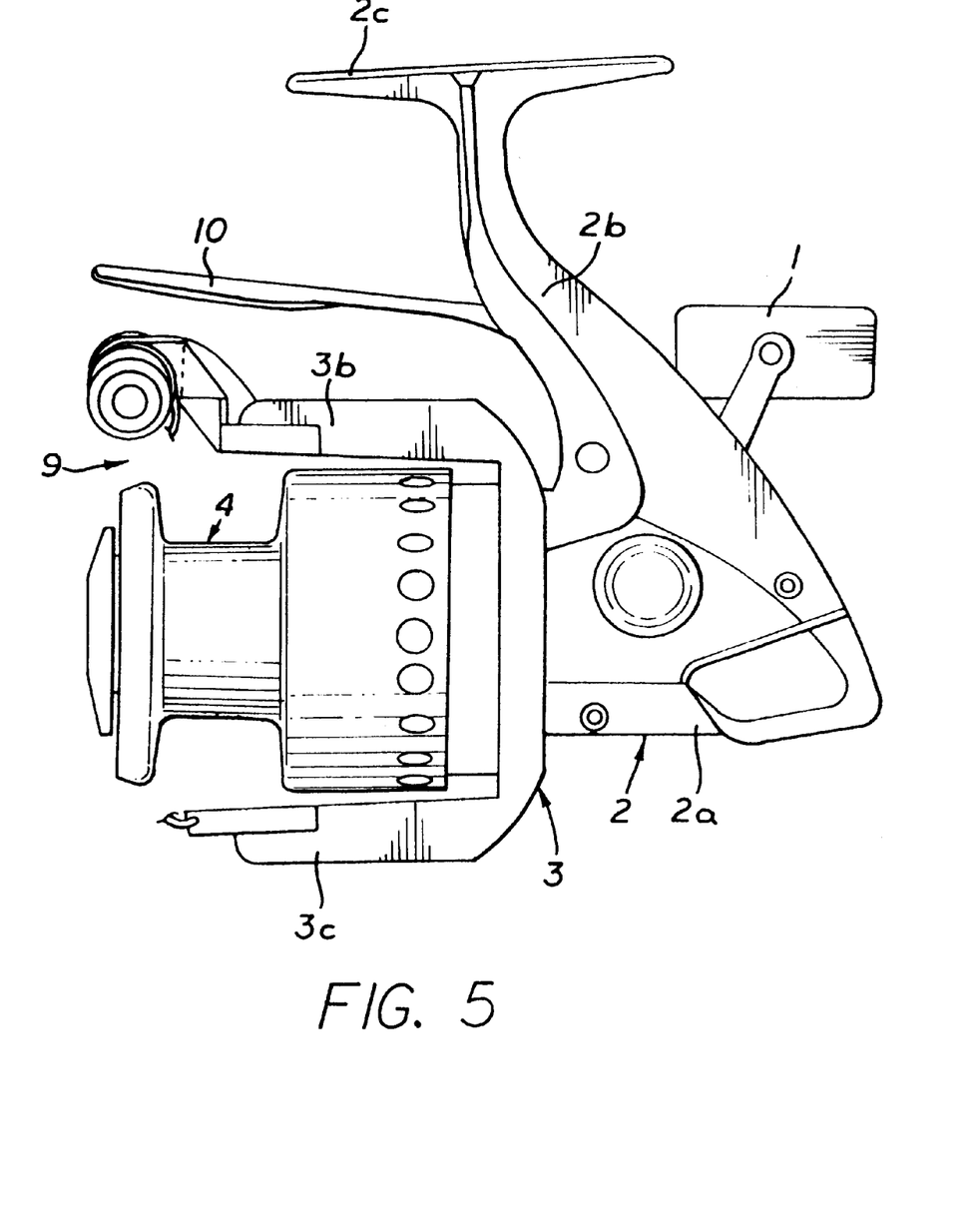
FIG. 5 is a side elevational view of another preferred embodiment in which the spinning reel does not include a brake mechanism.

The present invention may be implemented in an ordinary spinning reel which does not have a brake mechanism, as depicted in FIG. 5. In this embodiment, the basal end of the guard arm 10 is supported in cantilever fashion on the mounting leg member 2b; its distal end extends to the vicinity of the bail 9. In this design, the fingers are prevented from contacting the rotor, even in compact spinning reel designs.

The shape of the guard arm is not limited to those described above. The present invention includes all designs wherein the guard arm is disposed between the rod attachment member and the rotor.

With the spinning reel which pertains to the present invention, the provision of a guard arm disposed between the rod attachment member and the rotor prevents the fingers holding the rod from coming into contact with the rotating rotor when the reel is attached to the rod and operated while holding the rod in the vicinity of the attachment member.

What is claimed is:

1. A spinning reel for mounting on a fishing rod, said spinning reel comprising:
   (a) a reel body comprising
      (i) a reel body section, and
      (ii) a mounting leg member comprising a rod attachment member,
   (b) a reversibly rotatable rotor supporting a pair of rotor arms disposed on opposite sides of the rotor,
   (c) a spool, and
   (d) a guard arm connected to said reel body and disposed between said rod mounting member and said rotor, the guard arm extending at least substantially the length of the rotor arms.

2. A spinning reel as defined in claim 1, wherein said guard arm is cantilevered on said mounting leg member.

3. A spinning reel as defined in claim 2, wherein said guard arm comprises a guard member and a mounting member that supports said guard member.

4. A spinning reel as defined in claim 3, wherein said guard member is comprised of an elastomer.

5. A spinning reel as defined in claim 1, further comprising
   (e) a braking mechanism for braking said rotor when said rotor reverses, and (f) a brake lever for operating said braking mechanism, wherein said brake lever is pivotally supported on reel body section and has a distal end that extends between said guard arm and said mounting leg member.

6. A spinning reel as defined in claim 5, wherein said guard arm is cantilevered on said mounting leg member.

7. A spinning reel as defined in claim 5, wherein said guard arm is cantilevered on said brake lever.

8. A spinning reel as defined in claim 7, wherein said guard arm and said brake lever form a unitary structure.

9. A spinning reel as defined in claim 7, wherein said rotor and said guard arm have respective distal ends, and wherein said distal end of said guard arm extends adjacent said distal end of said rotor.

10. A spinning reel as defined in claim 1, wherein said rotor and said guard arm have respective distal ends, and wherein said distal end of said guard arm extends adjacent said distal end of said rotor.

11. A spinning reel as defined in claim 1, wherein said rotor comprises
 (i) a rotor cylindrical member that is rotatably supported on said reel body section,
 (ii) a pair of rotor arms disposed on opposite sides of said rotor cylindrical member, and
 (iii) a bail pivotally connected to said pair of rotor arms.

12. A spinning reel as defined in claim 11, wherein said rotor further comprises a pair of bail support members affixed to said bail, said bail support members having top ends, said bail support members pivotally connecting said bail to said pair of rotor arms, and wherein said guard arm extends at least to said top end of one of said bail support members.

13. The spinning reel as defined in claim 1, further comprising a brake lever disposed between said rod mounting member and said guard member.

14. The spinning reel as defined in claim 1, wherein the guard arm extends beyond a path of rotation of the rotor arms.

15. A spinning reel for mounting on a fishing rod, said spinning reel comprising:
 (a) a reel body comprising
  (i) a reel body section, and
  (ii) a mounting leg member comprising a rod attachment member,
 (b) a reversibly rotatable rotor,
 (c) a spool,
 (d) a pair of rotor arms disposed on opposite sides of the rotor, and a bail pivotally connected to the pair of rotor arms, and
 (e) a guard arm connected to said reel body and disposed between said rod mounting member and said rotor, the guard arm extending at least substantially the length of the rotor arms.

16. The spinning reel as defined in claim 15, wherein said guard arm is cantilevered on said mounting leg member.

17. The spinning reel as defined in claim 15, wherein said guard arm comprises a guard member and a mounting member that supports said guard member.

18. The spinning reel as defined in claim 15, wherein said guard member is comprised of an elastomer.

19. The spinning reel as defined in claim 15, wherein the rotor comprises a rotor cylindrical member that is rotatably supported on said reel body section.

20. The spinning reel as defined in claim 15, further comprising a brake lever disposed between said rod mounting member and said guard member.

21. The spinning reel as defined in claim 15, wherein the guard am extends beyond a path of rotation of the rotor arms and the bail.

22. A spinning reel for mounting on a fishing rod, said spinning reel comprising:
 (a) a reel body comprising
  (i) a reel body section, and
  (ii) a mounting leg member comprising a rod attachment member,
 (b) a reversibly rotatable rotor,
 (c) a spool,
 (d) a pair of rotor arms disposed on opposite sides of the rotor, and a bail connected to the pair of rotor arms to pivot between a line retrieve and a line release position,
 (e) a bail support member pivotally connected to the end of one of the rotor arms and supporting the bail; and
 (f) a guard arm connected to said reel body and disposed between said rod mounting member and said rotor, the guard arm extending along the rotor arm to the bail support member in line retrieve position.

* * * * *

UNITED STATES PATENT AND TRADEMARK OFFICE
CERTIFICATE OF CORRECTION

PATENT NO. : 5,988,549
DATED : November 23, 1999
INVENTOR(S) : Yasuhiro Hitomi; Jun Sato; Seiji Myojyo It is certified that error appears in the above-identified patent and that said Letters Patent is hereby corrected as shown below:

In column 4, Line 27, please delete the first occurrence of "and the" after the number 46.

In column 8, Line 24, please delete "am" and replace with --arm--

Signed and Sealed this

Sixteenth Day of January, 2001

Attest:

Q. TODD DICKINSON

*Attesting Officer*            *Commissioner of Patents and Trademarks*